United States Patent
Herzog et al.

(10) Patent No.: US 7,681,685 B2
(45) Date of Patent: Mar. 23, 2010

(54) PASSIVE PEDESTRIAN-PROTECTION FRONT HOOD HINGE

(75) Inventors: Matthias Herzog, Schoenwald (DE); Thomas Heinl, Waldershof (DE); Holm Riepenhausen, Rehau (DE); Claus Christian Stegg, Oelsnitz (DE); Dirk Tuchbreiter, Hennef (DE)

(73) Assignee: Scherdel INNOTEC Forschungs-und Entwicklungs-GmbH, Marktredwitz (DE)

( * ) Notice: Subject to any disclaimer, the term of this patent is extended or adjusted under 35 U.S.C. 154(b) by 0 days.

(21) Appl. No.: 11/885,866

(22) PCT Filed: Feb. 24, 2006

(86) PCT No.: PCT/EP2006/001700
§ 371 (c)(1),
(2), (4) Date: Jun. 26, 2008

(87) PCT Pub. No.: WO2006/094653
PCT Pub. Date: Sep. 14, 2006

(65) Prior Publication Data
US 2008/0302591 A1    Dec. 11, 2008

(30) Foreign Application Priority Data
Mar. 7, 2005    (DE) .................. 10 2005 010 412

(51) Int. Cl.
*B60K 28/10*    (2006.01)
(52) U.S. Cl. ...................................... 180/274

(58) Field of Classification Search ................. 180/274, 180/271; 16/222, 231, 250, 254
See application file for complete search history.

(56) References Cited

U.S. PATENT DOCUMENTS

2004/0134705 A1    7/2004    Nadeau et al.

FOREIGN PATENT DOCUMENTS

| EP | 1 090 819 A1 | 4/2001 |
|---|---|---|
| EP | 1090819 | 4/2001 |
| EP | 1 205 366 A1 | 5/2002 |
| EP | 1205366 | 5/2002 |
| EP | 1 470 971 A2 | 10/2004 |
| EP | 1470971 | 10/2004 |
| JP | 2004-308785 | 11/2004 |
| JP | 2004308785 | 11/2004 |
| WO | WO 2005/115822 A2 | 5/2005 |
| WO | WO 2005115822 | 12/2005 |

OTHER PUBLICATIONS

International Search Report, PCT/EP2006-001700, Jun. 30, 2006.

*Primary Examiner*—Faye M. Fleming
(74) *Attorney, Agent, or Firm*—Bingham McCutchen LLP

(57) ABSTRACT

A front hood hinge for connecting a front hood to the body of a vehicle, comprising a cuttable device having a cuttable member, a cutting knife and a stop determining the normal closed position of the front hood, and being designed such that, when a threshold value is exceeded, the stop is adapted to be displaced downwardly beyond the normal closed position against a resistance generated by the cuttable device, said resistance being caused by the cuttable member being cut in the course of the displacement of the stop upon movement of the cutting knife in relation to the cuttable member.

17 Claims, 4 Drawing Sheets

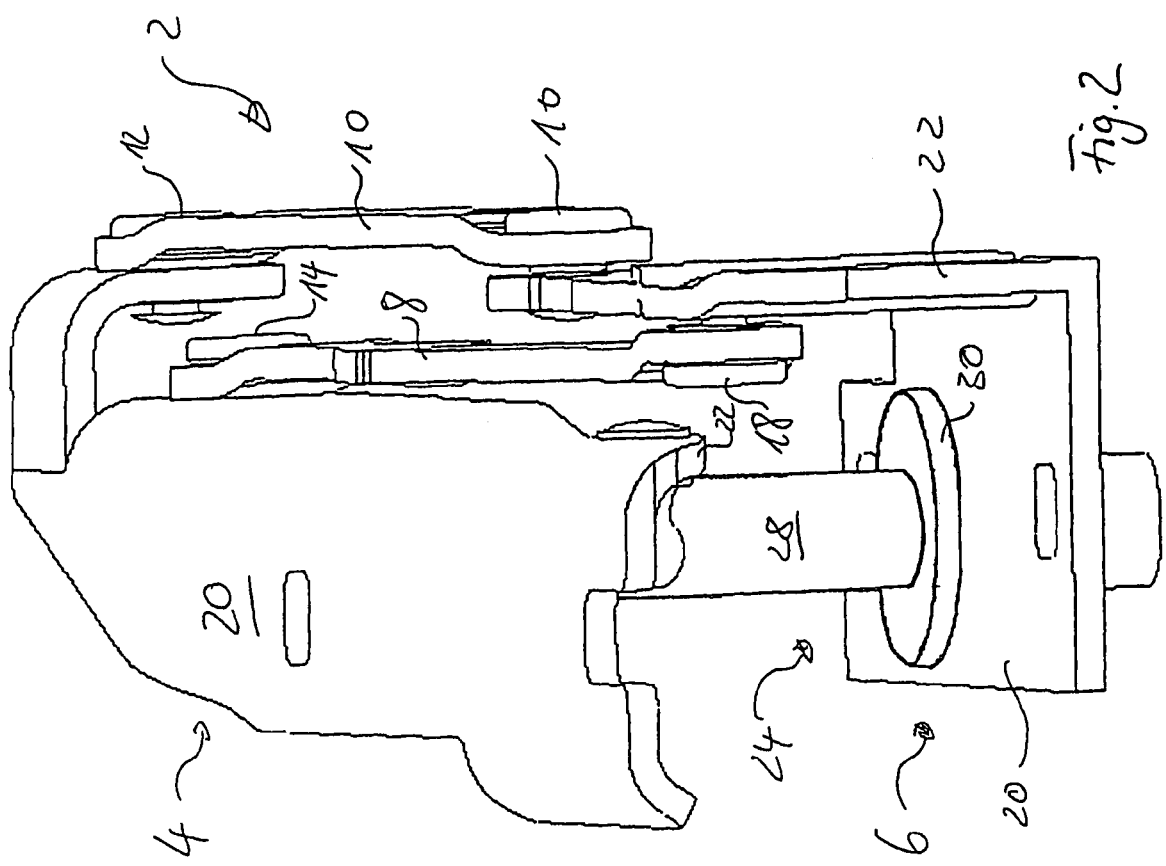

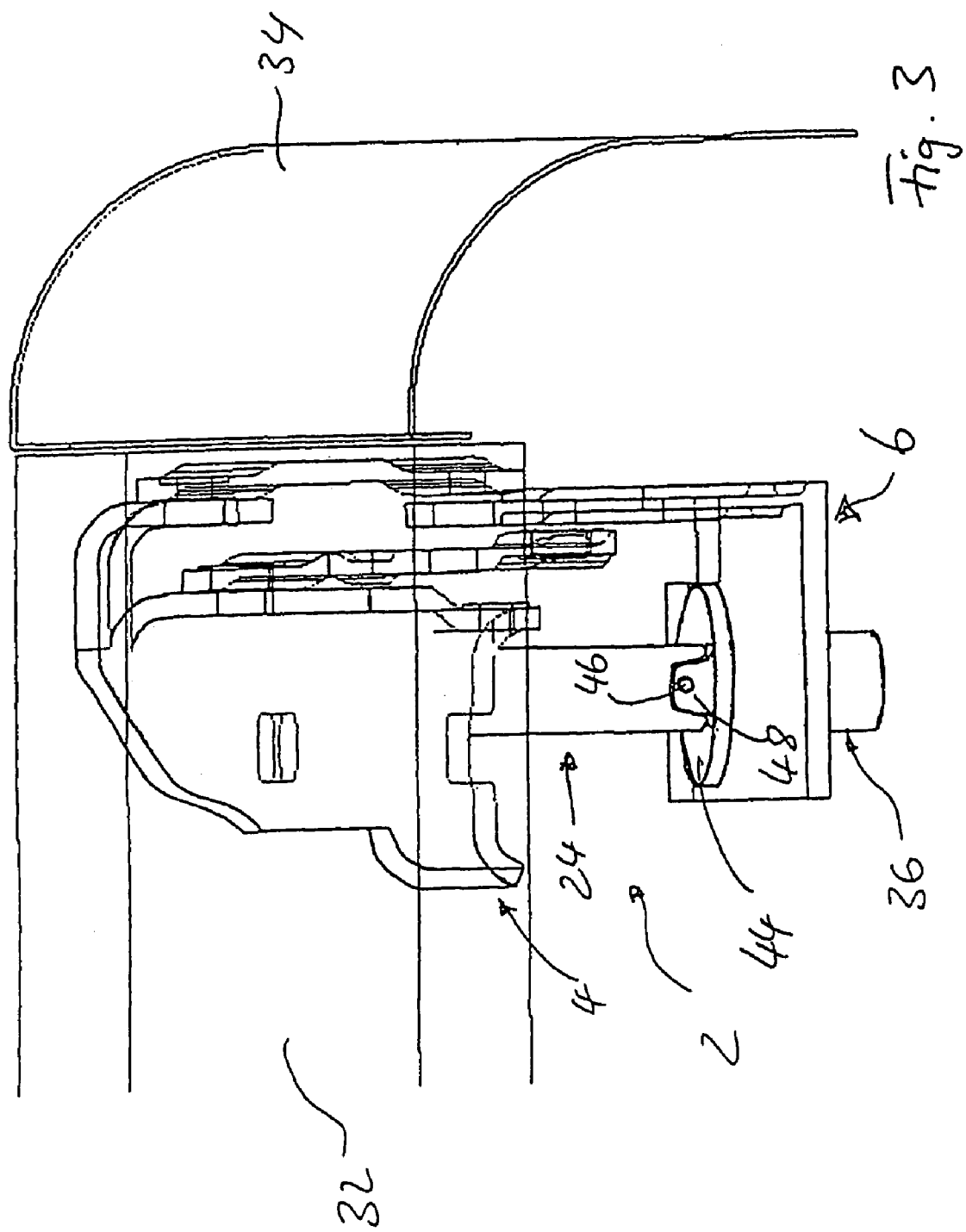

PASSIVE PEDESTRIAN-PROTECTION FRONT HOOD HINGE

The present invention relates to a pedestrian protection means for the front hood of a vehicle and in particular to a passive pedestrian protection means.

A considerable problem in case of collisions between pedestrians and vehicles exists with respect to the pedestrians' head impact on the front hood of the vehicle. Due to the typically very high delay values in a head impact, there may be caused extremely serious injuries to a pedestrian up to the death of the same. Thus, there are endeavors being made to provide pedestrian protection means in the front portion of vehicles. There are both active and passive systems possible. Active systems typically make use of a sensor system that is supposed to detect a collision with a pedestrian and then typically actuates an actuator which lifts the front hood into a protective position before the actual impact of the pedestrian takes place. From said lifted position, the hood on impact is gradually lowered against a spring or damper member in order to reduce the momentum of the head impact. In case of passive systems, the sensor means may be dispensed with, and in case of an impact the hood is typically displaced downwardly from the usual closed position against a spring or damper member. Passive systems necessitate sufficient space between the closed hood in the normal state and the engine located typically therebeneath in order to provide for a sufficient pedestrian-protection movement distance. However, by dispensing with the sensor arrangement, they have the advantage of a clearly higher fail-safe operation. In addition thereto, the problem of undesirable accidental activations is eliminated.

Passive pedestrian protection systems are known in the prior art. For example, DE 101 26 454 A1 illustrates a front hood hinge for connecting a front hood to the body of a vehicle, comprising a stop which is dimensioned such that it yields when a threshold value is exceeded, so that the front hood may be displaced beyond the normal closed position in downward direction. In the embodiment illustrated, the stop is a sheet metal tab that is bent by the force of the impact. As soon as the sheet metal tab is bent out of the way, the front hood "falls" down in substantially free manner.

The document DE 199 42 731 A1 similarly shows a front hood hinge comprising members that are sheared off when a predetermined threshold value is exceeded, so that the front hood can freely fall down.

WO 00/69704 shows front hood hinges in which individual hinge parts are formed with weakened regions so that they can yield and bend when a threshold value is exceeded.

WO 00/69708 shows front hood hinges that can be displaced downwardly against the force of a spring when a threshold value is exceeded, so that the front hood moves downwardly along with the same.

The document DE 199 57 871 A1 shows a front hood hinge formed with two linking members in the form of a four-joint hinge, with one of the four points of the linking members being disposed on the hinge upper part or the hinge lower part, respectively, in this hinge member so as to be longitudinally slidable against a deformation member, with said deformation member being deformed when a threshold value is exceeded, and lowering of the hood being possible due to the longitudinal movement of the fulcrum in the corresponding guide.

The afore-mentioned passive hinge constructions of the prior art have disadvantages. For instance, they are in part of relatively complicated construction, require relatively much constructional space and are not designed to provide for a predetermined resistance by way of the pedestrian-protection movement distance. Especially the complicated and space-consuming structure excludes the retrofitting of existing cars with such passive pedestrian protection systems by way of a slight modification in the hinge portion.

It is thus the object of the present invention to make available a front hood hinge which, in the normal closed position of the front hood, permits a downward movement of the front hood against a predetermined resistance when a threshold value is exceeded and which, in addition, is of simple and space-saving construction and can be realized in existing hinge types with minor modifications.

According to the invention, this object is met by a front hood hinge for connecting a front hood to the body of a vehicle, comprising a cuttable device, i.e. a device to be cut, having a cuttable member, a cutting knife and a stop determining the normal closed position of the front hood, and being designed such that, when a threshold value is exceeded, the stop is adapted to be displaced downwardly beyond the normal closed position against a resistance generated by the cuttable device, said resistance being caused by the cuttable member being cut in the course of the displacement of the stop upon movement of the cutting knife in relation to the cuttable member.

Front hood hinges typically are provided with an adjustable stop for adjusting the gap dimensions of the installed hood in relation to the remainder of the body, in particular the fenders etc. The invention resides on the idea of combining this stop with a cuttable device permitting the movement of the stop and the front hood, respectively, from the normal closed position in downward direction when a threshold value is exceeded and against a predetermined resistance.

Cuttable devices are known e.g. from DE 102 43 460 A1 as energy absorbers in a bumper system of motor vehicles. They are used in this field for absorbing the very high kinetic energy of vehicle collision speeds of up to approx. 20 km/h without damage being caused to the vehicle body proper. The achievement of the inventors consists in making use of this cuttable device, which is designed for absorbing extremely high energies, in a completely different environment with completely different performance specifications, and in meeting the object underlying the invention by way of the combination with said stop.

The cuttable member, in the course of the pedestrian protection movement, is subjected to cutting by the cutting knife and, in doing so, is consumed. This cutting operation on the one hand determines the threshold value as of which a pedestrian protection movement takes place. On the other hand, it generates the necessary resistance in order to extend the delay forces arising during a head impact over a sufficiently long period of time, so as to round off the delay peaks and to reduce the maximum value of the delay to a tolerable degree. The standard for the allowable delay is the so-called HIC value (HIC—Head Injury Coefficient) which is subject to legal requirements. The term "cutting knife" is to be understood broadly in the sense of "cutting member" and comprises both knife-like blades and chisel-like blades etc. There may be several cutting knives provided, or a cutting knife may be provided with several cutting portions. By selection of the geometry and the size of the cutting portions of the cutting knife and by selection of the material of the cuttable member, the resistance and the threshold value can be matched precisely to the particular application.

The arrangement according to the invention can be designed such that a replacement either of the entire cuttable device or of individual parts of the same, in particular the cuttable member thereof, can be effected very easily so that, after activation of the cuttable device, the original state of the latter may be easily reestablished.

The cuttable member preferably is rod- or bar-shaped. It is advantageous to fabricate the cuttable member of solid material. However, it is also possible to make use of a rod-shaped tube. By variation of the diameter or the external dimensions, it is however also possibly to vary the resistance by way of the pedestrian-protection movement distance, so that an in total optimum energy absorption can be realized. Other geometries, e.g. U-shaped etc. profiled rods, are conceivable as well.

The cuttable member preferably consists of plastics material. It is also possible to make use of a different soft, easily cuttable material, e.g. aluminum, Al 99, brass. The use of such temperature-resistant materials permits operations involving elevated temperatures, e.g. immersion-bath painting involving temperatures of approx. 200 to 220° C., to be performed after assembly.

The stop preferably is provided integrally on the cuttable member. In particular, an end side of the cuttable member constitutes the stop. In case of an adjustable connection of the stop or the cuttable member, respectively, to the front hood hinge, it is possible to determine the exact normal closed position on the front hood hinge in order to thus exactly adjust the gap fitting dimensions.

The front hood hinge preferably comprises a hinge top part for connection of the front hood, with the stop being arranged such that it operatively cooperates with the hinge top part in the closed state. In practical application, the stop in the closed state abuts the hinge top part so that the movement path of the hinge top part in downward direction is limited and the normal closed position of the front hood is thus determined.

The front hood hinge preferably comprises a hinge bottom part for connection to the body, with the cuttable device being connected to the hinge bottom part. It is also possible to connect the cuttable device directly to the body. However, an integral design of the hinge as a passive pedestrian protection means, having the cuttable device integrated in the hinge, is preferred. It is basically also possible to connect the cuttable device to the hinge top part and to provide the stop such that it operatively cooperates with the hinge bottom part in the normal closed position.

Preferably, the cutting knife is connected to the hinge bottom part and the cuttable member preferably is held in abutment therewith. "Held in abutment" refers to the positioning of the cuttable member at the cutting knife in such a manner that the cuttable member is in contact with the cutting knife. The threshold value for the force to be applied, which permits a movement beyond the normal position in downward direction, then is defined by the onset of the cutting effect of the cutting knife on the cuttable member. It is possible to provide the cuttable member in portions with a groove as it is generated by the cutting operation of the cutting knife in the cuttable member. It is then possible to combine the cuttable member with the cutting knife in such a manner that the cutting knife guides the cuttable member. It is possible to form the cutting knife circumferentially around the cuttable member. It is also possible to provide one or more cutting knives in circumferentially distributed manner.

The cuttable member preferably is arranged substantially perpendicularly to the hinge bottom part. The cuttable member may be arranged in the hinge bottom part such that, in the course of a pedestrian protection movement, it is moved towards the hinge bottom part and/or is moved through the same. "Substantially perpendicularly" comprises the exact arrangement at right angles as well as deviations therefrom of up to approx. 25°, approx. 15°, approx. 10° and approx. 5° or less.

The cuttable device preferable has a moment support, and it is possible to connect the cutting knife to the moment support.

The moment support preferably is dimensioned such that it operatively holds the cuttable member in an engaged position with the cutting knife and/or guides the same in the course of the pedestrian protection movement. The moment support thus may be in force-fit engagement with the cuttable member and can thus prevent that the cuttable member is disengaged from the cutting knife. It is also possible to dispense with the moment support, in particular when a completely or in essence circumferential cutting knife is used. The cutting knife then may be designed such that, for example by force-fit engagement with the cuttable member, it holds the latter in the initial position and guides the cuttable member during the cutting movement. The cutting knife and the cuttable member may be manufactured integrally from different materials. For example, the cutting knife may in portions be injection-molded into the cuttable member. Only upon application of a force above the threshold value does the cutting knife move in cutting manner in relation to the cuttable member.

Preferably, the cutting knife or the moment support, respectively, is connected to the hinge bottom part via an adjustment thread. It is thus possible to displace the cuttable device in its entirety for determining the correct normal closed position of the front hood. In addition thereto, this design permits an unproblematic replacement of the cuttable device by threadedly disassembling a spent cuttable device and threadedly installing a new cuttable device. The cuttable device thus is connected to the hinge bottom part via the adjustment thread only.

The front hood hinge preferably has a first linking member and a second linking member which together with the hinge top part and the hinge bottom part constitute a four-joint hinge, the cuttable device furthermore being preferably arranged laterally beside the four-joint hinge. This permits a passing movement of linking members and hinge parts when the hinge top part is displaced downwardly from the normal closed position. This arrangement also is particularly space-saving as it permits the complete hinge together with the cuttable device to be arranged in the region that is necessary for attachment of the hinge bottom part and the hinge top part to the vehicle body and the front hood, respectively. Other hinge types are conceivable as well, e.g. a one-joint hinge, e.g. in the form of a gooseneck hinge.

Preferably, the hinge bottom part and the hinge top part, in a cross-section at right angles to the longitudinal direction thereof, are of L-shaped configuration, with a leg each serving for connection to the front hood and the body, respectively, with the two linking members being joined to the respective other leg of the L-shaped hinge part at spatially fixed fulcrums. The hinge top part and the hinge bottom part preferably are manufactured of sheet-metal material. It is thus possible to realize a particularly simple and inexpensive manufacture with a very simple structure.

The invention relates furthermore to a vehicle comprising a front hood hinge according to the invention, and to a cuttable device as used in the front hood hinge according to the invention.

Developments of the invention will be elucidated in the following by way of an embodiment with reference to the drawings in which FIG. 1 shows a perspective view of a front hood hinge according to the invention;

FIG. 2 shows a view of the front hood hinge according to the invention as seen from the front or from the right-hand side in FIG. 1;

FIG. 3 shows a slightly modified front hood hinge according to the present invention, schematically illustrating parts of the vehicle;

Figure 1:
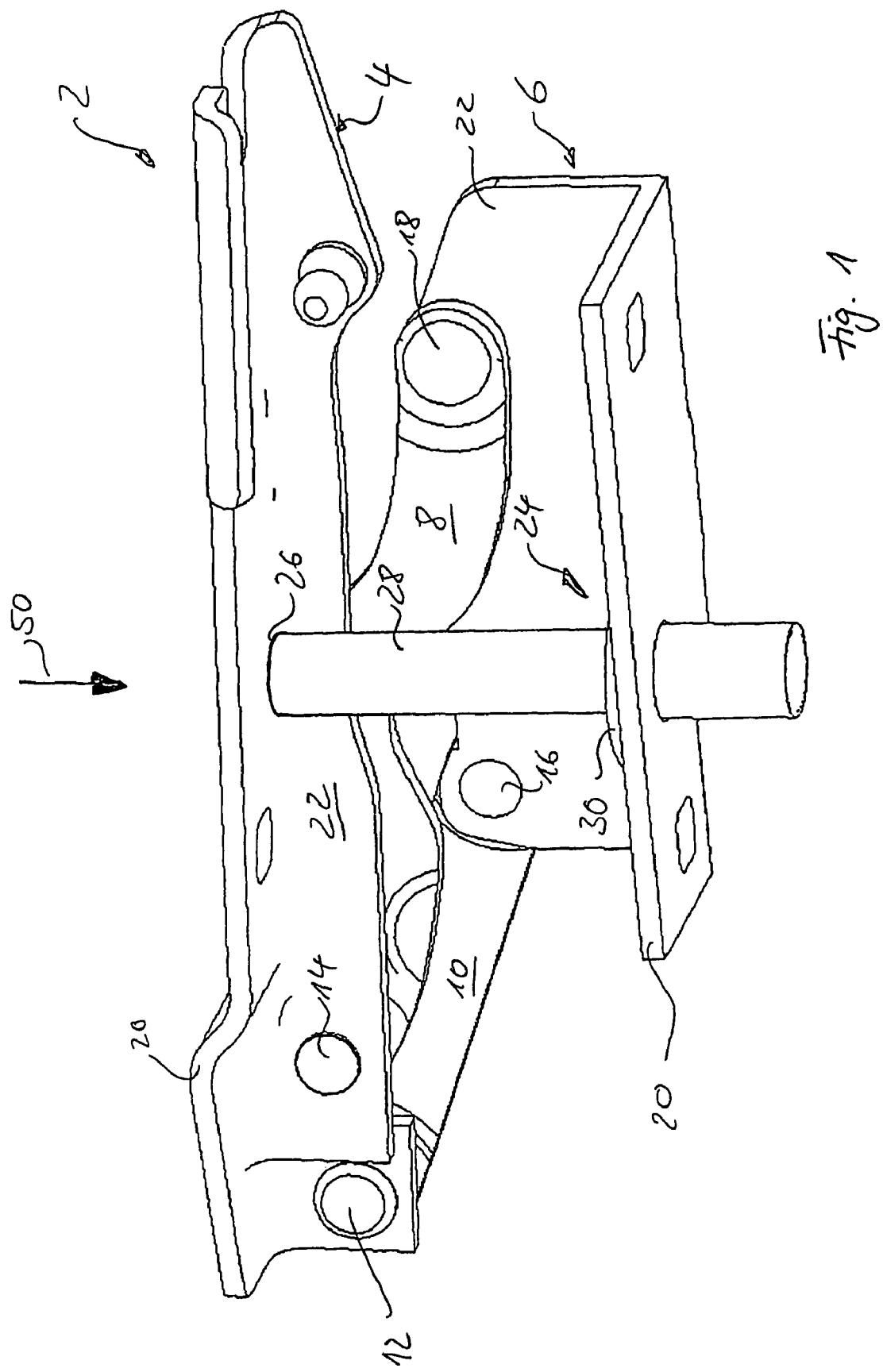

FIG. 1 illustrates a front hood hinge 2, comprising a hinge top part 4, a hinge bottom part 6 as well as two linking members 8 and 10 connecting the hinge top part 4 to the hinge bottom part 6 via spatially fixed rotary connections or fulcrums 12, 14, 16 and 18. The linking members 8 and 10 as well as the hinge top part 4 and the hinge bottom part 6 thus constitute a four-joint hinge.

The hinge top part 4 and the hinge bottom part 6 are made of sheet-metal material preferably by punching or pressing. As seen in a cross-section at right angles to the longitudinal direction thereof, they are of L-shaped configuration having, in use, a horizontal leg 20 for connection to the front hood and the vehicle body, respectively, as well a vertical leg 22 having the respective two linking members 8, 10 rotatably connected thereto.

In particular FIG. 2 shows that the two linking members 8 and 10 are arranged transversely to the longitudinal direction of the hinge parts 4 and 6 in a mutually shifted parallel manner, thus ensuring safe guiding of the hinge top part 4 in relation to the hinge bottom part 6. This arrangement also permits the hinge parts 4 and 6 as well as the two linking members 8 and 10 to be moved past each other until the vertical leg 22 of the hinge top part 4 hits against the horizontal leg 22 of the hinge bottom part 6.

A cuttable device 24, i.e. a device to be cut, in the normal closed position of the hinge, as illustrated in FIG. 1, constitutes a stop 26 which determines the normal closed position of the hinge and thus of the front hood. In particular, the cuttable device comprises a cuttable member 24, with the upper end thereof constituting the stop 26. The cuttable device 24 comprises furthermore a cutting knife 30 which fixes the cuttable member 28 in the normal closed position and, when a threshold value is exceeded, provides for a defined resistance against movement of the front hood from the normal closed position in downward direction by cutting cooperation with the cuttable member 28. The cuttable member 28 has a rod- or bar-shaped basic configuration and has a constant diameter in the embodiment illustrated. The cuttable member 28 may be made of any material. Preferably, this is a material of lower strength than that of the cutting knife 30. A preferred material is plastics material, in particular a plastics material that can be processed in simple and inexpensive manner in a injection molding process. PA, polyamide, is such a suitable material.

The cuttable member 28 projects downwardly through the horizontal leg 20 of the hinge bottom part 6. A suitable opening may be produced e.g. in the punching operation. In particular, the cuttable device 24 is supported in or attached to this horizontal leg of the hinge bottom part 6. In particular, the cutting knife 30 or a suitable support for the same, is attached to the horizontal leg 20 of the hinge bottom part 6. The cutting knife 30 may be adjustably mounted via an adjustment thread (not shown) formed on the hinge bottom part 6 e.g. by embossing, integral embossing or machining. This facilitates on the one hand the replacement of a cuttable device and on the other hand permits an adjustment of the stop 26 such that the gap dimensions at the front hood can easily be adjusted in correct manner.

The widths of the horizontal legs 20 of the hinge top part 4 and the hinge bottom part 6 are typically determined by the requirements with respect to the attachment to the front hood and to the vehicle body, respectively, as in case of too narrow legs 20, the moment forces acting on the front hood cannot be taken up reliably. It can also be seen that the four-joint hinge constituted by the vertical legs 20 and the linking members 8, 10 is clearly narrower than the width of the horizontal legs. The cuttable device 24 thus may be accommodated in relatively unproblematic manner beside the four-joint hinge and nevertheless within the width of the horizontal legs 20. This permits a substantial reduction of the necessary installation space. In addition thereto, it permits vehicles of current production series to be retrofitted with a front hood hinge 2 with cuttable device 24 according to the invention.

FIG. 3 illustrates a perspective view of the front hood hinge 2 according to the invention, schematically illustrating a front hood 32 as well as a fender 34 as a fixed body component. Details of this slightly modified embodiment will be discussed in the following.

Figure 5:
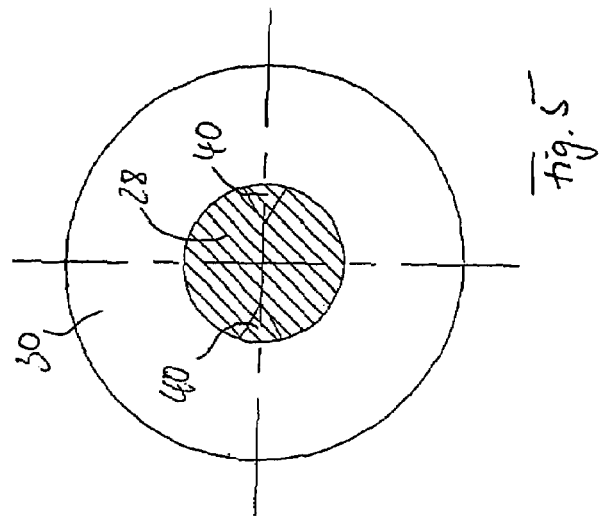
FIG. 5 shows a plan view of the cuttable device of FIG. 4.
Figure 4:
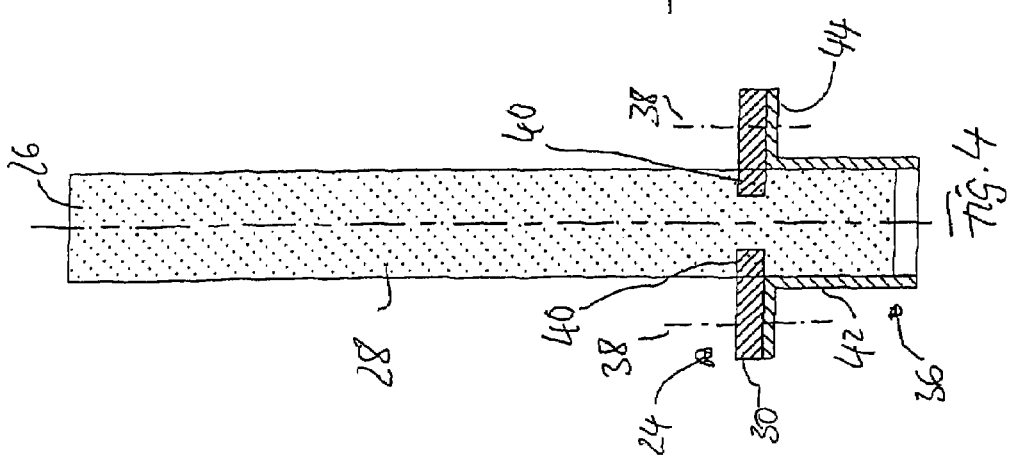
FIG. 4 shows a view of a cuttable device according to the invention.

FIG. 4 shows the cuttable device 24 in more detailed fashion. It is possible to see the cuttable member 28 as well as the cutting knife 30 cooperating therewith. Furthermore, it is possible to see a moment support 36 having the cutting knife 30 connected thereto, as illustrated by way of symmetry lines 38 for the corresponding screw connections. FIG. 5 shows the cuttable member 28 in a plan view. One can see the cutting knife 30 having two cutting portions 40 projecting into the interior of the otherwise annular cutting knife 30. It can be seen that the cutting portions 40 project into the cuttable member 28. The cutting knife 30 may be designed e.g. in the form of an insert part for the injection-molding tool used to mold the cuttable member 28. The cutting portions 40 thus may be molded into the cuttable member 28, and the cuttable member 28 in use constitutes an integral component together with the cutting knife 30. This ensures in particular also that the cuttable member 28 cannot simply be pulled out in upward direction when the front hood is opened. The moment support 36 constitutes a support for the cutting knife 30 by means of which the latter can be connected to the hinge bottom part 6. In particular, the moment support 36 constitutes a guide for the cuttable member 28 in order to avoid lateral buckling or evasion and thus indeterminate resistance patterns in case of a collision with a pedestrian. The moment support 36 in particular comprises a tubular guide 42 and a flange 44 for connection to the cutting knife 30. On the outside of the tubular guide 42, there may be provided an adjustment thread (not shown). Typical dimensions for the cuttable device 2 are a diameter of approx. 10 to 20 mm of the cuttable member 28 with a length between 70 and 150 mm. A typical diameter 30 of the cutting knife may be 30 to 40 mm. A typical thickness of the cutting knife 30 inclusive of the mounting flange 44 may be approx. 3 to 8 mm.

In the embodiment of FIG. 3 the cutting knife 30 is of slightly different design. In particular, the moment support 36 or the upper flange 44 thereof has two chisel-like or arbor-like cutting projections 46 which are arranged in or integrally molded to corresponding bearing blocks 48.

Figure 6:
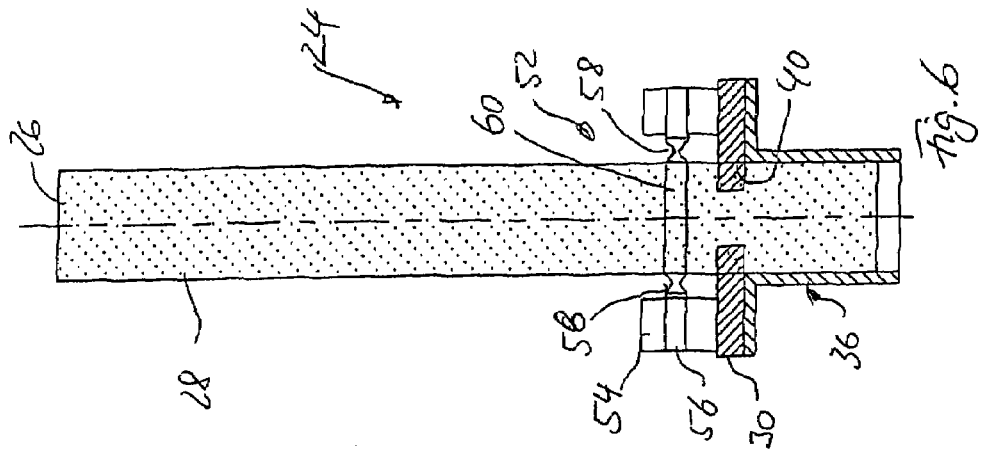
FIG. 6 shows a view of an alternative embodiment of a cuttable device.

FIG. 6 illustrates an alternative embodiment of the cuttable device 24. In this embodiment, there is provided a means 52 in addition to the features already described, through which a defined threshold value for triggering the cuttable device 24 can be set. The means 52 has two bearing blocks 54 which, in the embodiment illustrated, are arranged on the cutting knife 30. The bearing blocks 54 may be secured to the cutting knife 30, they may be formed integrally with the cutting knife 30, but they may also just rest on the cutting knife. Furthermore, one can see a predetermined-breaking member 56. The predetermined-breaking member 56 has weakened zones 58 so that the threshold value can be defined. In the embodiment illustrated, the threshold member 56 is a rod-shaped member and in particular a round rod-shaped member in which the weakened zones 58 are formed in the form of circumferential notches. The threshold member 56 is arranged in the cuttable member 28 by way of a corresponding opening. It is possible to integrally mold this threshold member 56 into the cuttable member 28. As an alternative, the cuttable member 38 may be provided with a corresponding opening which in the shape thereof preferably corresponds to the shape of the threshold member 56 so that the latter may be inserted though this opening. By way of a suitable choice of a press fit, the threshold member 56 is safely held in the cuttable member 28 after insertion of the same. In particular in case of the latter type of manufacture, the threshold members 56 may be replaced in relatively unproblematic manner, thus allowing setting of the threshold value in accordance with the requirements in relatively unproblematic manner. The expert will note that the bearing blocks 54 are not cogently necessary. Rather, the threshold member 56, with the lateral projections of the same, may also be supported on the cutting knife 30 or another member.

The functioning of the front hood hinge 2 according to the invention in case of "normal operation" corresponds to that of a common four-joint hinge of similar construction. Instead of the otherwise usual stop, the upper end of the cuttable member 28 is designed as stop 26 and thus determines the normal closed position. Only in case of a collision, in which an impact occurs substantially in the direction of arrow 50 in FIG. 1, is the front hood hinge 2 of the present invention basically different from these usual hinges. When the force exerted by the impact in the direction of the arrow 50 exceeds the threshold value on one or both front hood hinges 2 for connection to the front hood, the cuttable member 28 will be displaced substantially in its longitudinal direction with respect to the cutting knife 30. Thus, there is caused a cutting operation on the cuttable member 28, in which a pre-settable resistance force acts against the movement of the hinge top part 4 and the front hood 32, respectively, beyond the normal closed position in downward direction. This causes a delay in the absorption of the impact energy by the front hood and thus clearly reduces the HIC value occurring on impact. When the impact force diminishes or when the front hood or the hinge, respectively, approaches another stop, the cutting correlation between cutting knife 30 and cuttable member 28 terminates.

It is to be pointed out that the term "pedestrian" in connection with the current application equally comprises also other traffic participants, in particular motorcyclists, bicyclists etc. Furthermore, it is to be pointed out that it is basically also possible to provide the cutting knives 30 on the hinge top part 4 and to form the lower end of the cuttable member 28 as a stop 26. The cutting knife 30 then is preferably arranged in spaced manner from the hinge top part, thus rendering possible relative movement between hinge top part and cuttable member 28. The details described hereinbefore with respect to the embodiments illustrated thus are applicable to such an embodiment in corresponding manner, with the hinge top part having to be replaced by the hinge bottom part and vice versa.

The invention claimed is:

1. A front hood hinge (2) for connecting a front hood (32) to a vehicle body, comprising a cuttable device (24) having a cuttable member (28), a cutting knife (30) and a stop (26) defining a normal closed position of the front hood, and being designed such that, when a threshold value is exceeded, the stop (26) is adapted to be displaced downwardly beyond the normal closed position against a resistance generated by the cuttable device (24), said resistance being caused by the cuttable member (28) being cut in the course of the displacement of the stop (26) upon movement of the cutting knife (30) in relation to the cuttable member (24).

2. The front hood hinge (2) according to claim 1, wherein the cuttable member (28) is rod-shaped.

3. The front hood hinge (2) according to claim 1, wherein the cuttable member (28) consists of plastics material.

4. The front hood hinge (2) according to claim 1, wherein the cuttable member (28) is integrally provided with the stop (26).

5. The front hood hinge (2) according to claim 1, wherein the stop (26) is adjustably connected to the front hood hinge (2).

6. The front hood hinge (2) according to claim 1, further comprising a hinge top part (4) for connection to the front hood, said stop (26) being arranged such that it operatively cooperates with the hinge top part (4) in the closed state.

7. The front hood hinge (2) according to claim 1, further comprising a hinge bottom part (6) for connection to the vehicle body, said cuttable device (24) being connected to the hinge bottom part (6).

8. The front hood hinge (2) according to claim 7, wherein the cutting knife (30) is connected to hinge bottom part (6) and the cuttable member (28) is held in abutment therewith.

9. The front hood hinge (2) according to claim 7, wherein the cuttable member (28) is arranged substantially at right angles to the hinge bottom part (6).

10. The front hood hinge (2) according to claim 9, wherein the cuttable member (28) projects through the hinge bottom part (6).

11. The front hood hinge (2) according to claim 1, wherein the cuttable device (24) comprises furthermore a moment support (36) having the cutting knife (30) connected thereto and being dimensioned such that it operatively holds and guides the cuttable member (28) in an engaged position with the cuffing knife (30).

12. The front hood hinge (2) according to claim 7, wherein the cutting knife (30) is connected to the hinge bottom part (6) via an adjustment thread.

13. The front hood hinge (2) according to claim 1, further comprising a four-joint hinge constituted by a first linking member (8) and a second linking member (10), said cuttable device (24) being arranged laterally beside the four-joint hinge.

14. The front hood hinge (2) according to claim 13, wherein the hinge bottom part (6) and the hinge top part (4), in a cross-section transversely to the longitudinal direction, are of L-shaped configuration with a leg for connection to the front hood and to the vehicle body, respectively, said two linking members (8, 10) being connected to the respective other leg (22) at fixed fulcrums.

15. The front hood hinge (2) according to claim 13, wherein the two linking members (8, 10) are arranged beside each other in longitudinal direction such that they may pivot past each other.

16. A vehicle comprising a front hood hinge (2) in accordance with claim 1.

17. A cuttable device (24) for a front hood hinge (2) in accordance with claim 1, comprising a cuttable member (28), a cutting knife (30) and a stop (26) defining the normal closed position of the front hood (32), the cuttable device (24) being designed such that, when a threshold value is exceeded, the stop (26) is adapted to be displaced beyond the normal closed position against a resistance generated by the cuttable device (24), said resistance being caused by the cuttable member (28) being cut in the course of the displacement of the stop (26) upon movement of the cuffing knife (30) in relation to the cuttable member (24).

* * * * *